May 7, 1968 R. B. MORTON 3,381,597

SHUTTER MECHANISM FOR PHOTOGRAPHIC CAMERA

Filed Sept. 13, 1965

INVENTOR.
Robert B. Morton
BY Brown and Mikulka

ATTORNEYS

# United States Patent Office 3,381,597
Patented May 7, 1968

3,381,597
SHUTTER MECHANISM FOR PHOTOGRAPHIC CAMERA
Robert B. Morton, Chicago, Ill., assignor to Polaroid Corporation, Cambridge, Mass., a corporation of Delaware
Filed Sept. 13, 1965, Ser. No. 486,653
8 Claims. (Cl. 95—55)

This invention relates to photographic cameras and more particularly to an automatic shutter mechanism for a camera.

In many cameras, and especially commercial cameras such as those designed for taking identification photographs where hundreds, or perhaps thousands, of photographs may be taken in relatively rapid succession, an actuator of the mechanical type, especially one which must be "cocked," would be unduly laborious and time consuming. An electrically actuated shutter mechanism has been found to be preferable in such applications. Such a shutter mechanism should have long life and a satisfactorily high shutter efficiency, and should also be reliable and easy to operate.

Accordingly, it is an object of this invention to provide an electrically actuated shutter mechanism for a photographic camera which has a long life and is reliable, and yet is simple in operation and construction.

It is another object of this invention to provide an electrically actuated shutter mechanism for a photographic camera which has a satisfactorily high shutter efficiency.

Briefly, in one embodiment thereof, the shutter mechanism constituting this invention includes a shutter blade rotatably mounted on a mounting plate on the opposite side thereof from its actuator. The shutter blade has a shutter pin extending through an elongated arcuate slot in the plate. The shutter actuator comprises a lever pivotally mounted on the plate. The non-working end of the lever is operated upon by an armature of a solenoid working against a return spring. Extending from the opposed end of the lever to form the working parts thereof are a pair of converging leaf spring arms. The shutter pin extending from the shutter blade through the mounting plate is received between the spring arms near the free ends thereof.

In operation, when the solenoid is energized, the armature moves suddenly. This impulse pivots the lever against the bias of the return spring. This rapid arcuate movement of the lever causes a first one of the leaf spring arms to store energy and then rapidly to impart the stored energy to the shutter blade through the pin, causing the shutter blade to move with augmented velocity and rapidly unblock the exposure aperture. The first spring arm acts as a shock absorber to absorb the shock on the shutter mechanism elements caused by the sudden impulse imparted to the lever by the solenoid through its armature. Near the limit of its angular displacement, the lever operates a switch, de-energizing the solenoid and allowing energy stored in the return spring to take full effect on the lever. Also, near the end of the arc of movement of the lever, the second leaf spring arm "catches" the shutter pin, acting as a shock absorber to prevent the impact of the pin against the end of the arcuate slot in the mounting plate. The return spring quickly returns the lever to its original position. This return movement induces the second leaf spring arm, in the manner described above, to store energy and then quickly to impart the stored energy to the shutter blade to rapidly drive the shutter blade back to its light blocking position.

The second spring arm, acting on the pin, serves also to cushion the sudden acceleration of the shutter blade. The first spring arm "catches" the shutter pin near the end of the return stroke, acting as a shock absorber to prevent the otherwise violent impact of the lever with a stop member affixed to the mounting plate.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which is indicated in the claims.

For a fuller understanding of the nature and objects of the invention, reference should be had to the following detailed description taken in connection with the accompanying drawing wherein.

Figure 1:
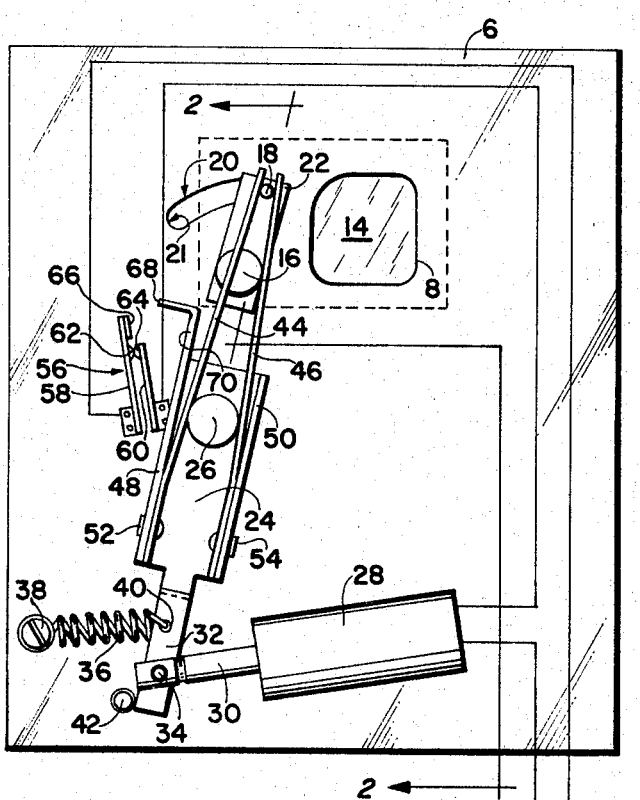
FIGURE 1 is a side view of the novel shutter mechanism.
Figure 2:
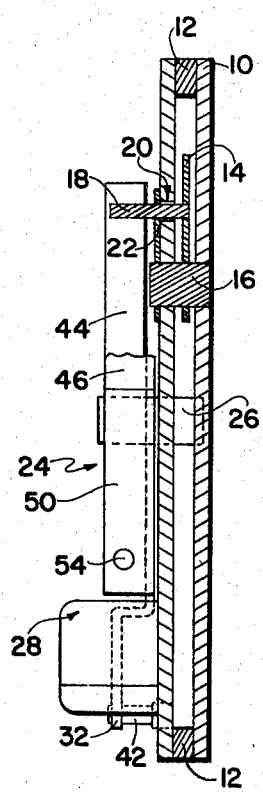
FIG. 2 is a section view along lines 2—2 in FIGURE 1.

Referring to the drawing, applicant's shutter mechanism will be seen mounted upon a mounting plate. The mounting plate 6 defines an exposure aperture 8 which would, of course, be disposed in registry with the camera objective when the shutter mechanism is mounted in place within a camera. A supporting back plate 10 is secured to and spaced from the mounting plate 6 by connecting members 12. Back plate 10 has an aperture (not shown) similar to exposure aperture 8 and in registry therewith.

A shutter blade 14, pivotally mounted on the mounting plate 6 by means of a rivet 16, is provided to unblock and block the exposure aperture 8 and thus to control the amount of light passing through the aperture 8 to photosensitive materials (not shown) which would be positioned to receive light through the aperture 8. The shutter blade 14 pivots across the exposure aperture 8 on the opposed side of mounting plate 6 from its actuating apparatus and in the space provided between mounting plate 6 and back plate 10.

A cantilevered shutter pin 18 extends through an elongated arcuate slot 20 in the mounting plate 6, providing means on the opposed side of plate 6 from shutter blade 14 by which the blade 14 can be moved. The shutter pin 18 is received in an aperture in a crank link 22 which is pivotally mounted on the rivet 16 on the opposed side of mounting plate 6 from the shutter blade 14. The crank link 22 serves to stabilize the pin 18, and in so doing functions also to stabilize the oscillatory motion of the shutter blade 14. The end 21 of slot 20 defines the limit of any possible overtravel of the shutter blade 14 in the counter clockwise direction.

The shutter actuator constituting the essence of this invention, in one form thereof, includes a carriage in the form of a lever 24 rotatably mounted on pivot 26 on mounting plate 6. A solenoid 28 and armature 30 are provided to drive the lever 24. The solenoid 28 is energized from a power source, shown schematically in FIGURE 1 at 31. The armature 30 is pivotally connected to an offset extension 32 of lever 24 at point 34.

A return spring 36 provides a driving force on the lever 24 when the solenoid 28 is de-energized, the spring 36 being connected at one end to the mounting plate 6 by fastener 38. The other end of the spring 36 is hooked through an opening 40 in the offset extension 32. A stop member 42 limits the travel of the lever 24 when under the influence of return spring 36.

In order to cushion the shutter blade 14 and give the shutter mechanism a satisfactorily high shutter efficiency a pair of resilient leaf spring arms 44, 46 are provided. Leaf spring arms 44, 46, extend convergingly from the lever 24, the arms 44, 46 being connected to flanges 48, 50, respectively, on the lever 24 by means of rivets 52, 54. The shutter pin 18 is received between the arms 44, 46 near the ends thereof. The resiliency of the spring arms 44, 46 provides a whip-like action on the shutter blade 14, enabling augmented shutter speeds to be achieved with the more slowly moving armature 30 of solenoid 28. The advantages of using low mass, resilient members, such as spring arms 44, 46, has many advantages. These will become evident from a description below of the operation of the shutter mechanism.

However, before describing the operation of the mechanism, it should be noted that a switch 56 is mounted on mounting plate 10, being connected in series with solenoid 28 and power source 31 through a main switch 57 operated by a shutter trip button (not shown). The switch 56 thus controls the energization of the solenoid 28 from the power source 31. The switch 56 comprises a pair of contact blades 58, 60 upon which are mounted a pair of contacts 62, 64, respectively. An insulator 66 is affixed to the free end of contact blade 58. The switch 56 is operated by the tip 68 of an L-shaped extension 70 of flange 48 which engages the insulator 66 and separates the contact blades 58, 60.

In operation, the solenoid 28 and its armature 30 and the return spring 36 are effective to drive the lever 24 through an exposure cycle. The first half of the exposure cycle, during which the exposure aperture 8 is unblocked, is initiated by actuating the shutter trip button. Actuation of the shutter trip button closes a main switch 57 in series with the solenoid 28. The solenoid 28 is energized from the power source 31, causing the armature 30 to be very suddenly drawn into the solenoid 28. This impulse is applied to the lever 24, the lever 24 being pivoted very rapidly in the counterclockwise direction (in FIGURE 1) against the bias of return spring 36. The initial rapid movement of the lever 24 and the inertia of the shutter blade 14, crank link 22, and shutter pin 18 cause the leaf spring arm 46 to deform and store potential energy. After a brief lapse of time during which energy is stored in spring arm 46, the arm 46 rapidly imparts its stored energy to the shutter blade 14 through shutter pin 18 with the result that an augmented shutter speed is attained. It is important to note that spring arm 46 also acts to cushion the shock of the sudden impulse imparted to the lever 24 and shutter blade 14 by the solenoid 28 and armature 30. This cushioning action is effective to prolong the useful life of the shutter mechanism.

Near the end of the stroke of armature 30, the tip 68 of L-shaped extension 70 engages insulator 66 on contact blade 58, causing the switch 56 to open and the solenoid 28 to be deenergized. The second half of the exposure cycle, during which the exposure aperture 8 is again blocked, is thus initiated. The cushioning effect of the spring arms 44, 46 should again be noted. Near the end of the first half of the exposure cycle, spring arm 44 "catches" the shutter pin 18, acting as a shock absorber to prevent the impact of the pin 18 against the end 21 of arcuate slot 20 in mounting plate 26.

Upon deenergization of the solenoid 28, the lever 24 is influenced solely by the potential energy stored in return spring 36. The spring 36 causes the lever 24 to be rapidly snapped in the clockwise direction into abutment with stop member 42. Potential energy is rapidly stored in leaf spring arm 44 in the same manner as it was in spring arm 46 during the first half of the exposure cycle. As this happens, spring arm 44 acts to absorb and cushion the sudden impulse imparted to the lever 24 by return spring 36. The energy stored in spring arm 44 is rapidly imparted to the shutter blade 14 through shutter pin 18, driving the shutter blade 14 back to its light blocking position at augmented velocity. It should be understood that while either of the spring arms 44, 46 is imparting its stored energy to the shutter blade, the blade is being driven by the angular movement of the lever 24. Thus, the shutter blade velocities are a result of the sum of the effects of the release of stored energy in the spring arm and the concurrent angular driving force of the lever 24.

Near the end of the exposure cycle, as the shutter blade 14 approaches its light blocking position, spring arm 46 "catches" pin 18, acting to cushion the otherwise violent impact of the offset extension 32 of lever 24 with stop member 42 on mounting plate 6.

It will be evident that this invention provides an electrically actuated shutter mechanism which has satisfactorily high shutter efficiency and long life, and yet is inexpensive to produce and simple in structure and operation.

Structural implementations other than that described above are within the purview of this invention. For example, a carriage which is reciprocated, rather than oscillated, by an electromagnetic device is embraced by this invention. An arrangement substituting coil springs for the leaf springs 44, 46 is also feasible. Since certain other changes may be made in the above apparatus without departing from the scope of the invention herein involved, it is intended that all matter contained in the above description shall be interpreted as illustrative and not in a limiting sense.

What is claimed is:

1. A shutter mechanism for a photographic camera comprising:
   means defining an exposure aperture;
   shutter means movable between a light blocking position and a light unblocking position with respect to said exposure aperture;
   transmission means including energy-storing means operatively engaging said shutter means, said transmission means being movable through an exposure cycle; and
   drive means for moving said transmission means rapidly in a first direction during a first portion of said exposure cycle to apply a first high velocity driving force to said shutter means, said first driving force causing initial movement of said shutter means from said light blocking position toward said light unblocking position and simultaneously causing said energy-storing means to store energy and then rapidly to impart the stored energy to said shutter means to drive said shutter means at augmented velocity toward and to said light unblocking position, said drive means moving said transmission means rapidly in a second direction during a second portion of said exposure cycle to apply a second high velocity driving force to said shutter means, said second driving force causing initial movement of said shutter means from said light unblocking position toward said light blocking position and simultaneously causing said energy-storing means to store energy and then rapidly to impart the stored energy to said shutter means ot drive said shutter means at augmented velocity toward and to said light blocking position, said energy-storing means absorbing shock from said drive means at the initiation and termination of each portion of said exposure cycle.

2. A shutter mechanism for a photographic camera comprising:
   means defining an exposure aperture;
   shutter means movable between a light blocking position and a light unblocking position with respect to said exposure aperture;
   a carriage movable through an exposure cycle;
   energy-storing means on said carriage, said energy-storing means operatively engaging said shutter means; and
   drive means for moving said carriage rapidly in a first direction during a first portion of said exposure cycle to apply a first high velocity driving force to said shutter means, said first driving force causing initial movement of said shutter means from said light blocking position toward said light unblocking position and simultaneously causing said energy-storing means to store energy and then rapidly to impart the stored energy to said shutter means to drive said shutter means at augmented velocity toward and to said light unblocking position, said drive means moving said carriage rapidly in a second direction during a second portion of said exposure cycle to apply a second high velocity driving force to said shutter means, said second driving force causing initial movement of said shutter means from said light unblocking position toward said light blocking position and simultaneously causing said energy-storing means to store energy and then rapidly to impart the stored energy to said shutter means to drive said shutter means at augmented velocity toward and to said light blocking position, said energy-storing means absorbing shock from said drive means at the initiation and termination of each portion of said exposure cycle.

3. The shutter mechanism defined by claim 1 wherein said drive means includes a solenoid and armature for driving said carriage through said first portion of said exposure cycle and a return spring for driving said carriage throughs said second portion of said exposure cycle.

4. A shutter mechanism for a photographic camera comprising:
means defining an exposure aperture;
shutter means movable between a light blocking position and a light unblocking position with respect to said exposure aperture;
a pivotally mounted lever movable through an exposure cycle;
energy-storing means on said lever, said energy-storing means operatively engaging said shutter means; and
drive means for pivoting said lever rapidly in a first direction during a first half of said exposure cycle to apply a first high velocity driving force to said shutter means, said first driving force causing initial movement of said shutter means from said light blocking position toward said light unblocking position and simultaneously causing said energy-storing means to store energy and then rapidly to impart the stored energy to said shutter means to drive said shutter means at augmented velovity toward and to said light unblocking position, said drive means pivoting said lever rapidly in a second directon during a second half of said exposure cycle to apply a second high velocity driving force to said shutter means, said second driving force causing inital movement of said shutter means from said light unblocking position toward said light blocking position and simultaneously causing said energy-storing means to store energy and then rapidly to impart the stored energy to said shutter means to drive said shutter means at augmented velocity toward and to said light blocking position, said energy-storing means absorbing shock from drive means at the initation and termination of each half of said exposure cycle.

5. The invention defined by claim 4 wherein said shutter means includes a projection therefrom and wherein said energy-storing means comprises a pair of juxtaposed, cantilevered leaf spring arms embracing said projection.

6. A shutter mechanism for a photographic camera comprising:
means defining an exposure aperture;
a pivotally mounted shutter blade movable between a light blocking position and a light unblocking position with respect to said exposure aperture;
a pivotally mounted lever movable through an exposure cycle;
a pair of cantilevered leaf spring arms extending from said lever and embracing a portion of said shutter blade;
a return spring connected to said lever and biasing said shutter blade to said light blocking position;
force means for pivoting said lever rapidly in one direction against the bias of said return spring during a first portion of the exposure cycle, causing a first one of said spring arms to store energy and then rapidly to impart the stored energy to said shutter blade to drive said shutter blade at augmented velocity to rapidly unblock said exposure aperture; and
means for releasing said force means to permit said return spring to rapidly pivot said lever in the opposite direction during a second portion of the exposure cycle, causing the second of said spring arms to store energy and then rapidly to impart the stored energy to said shutter blade to drive said shutter blade at augmented velocity to rapidly block said exposure aperture, said leaf spring arms absorbing shock from said drive means at the initiation and termination of each portion of said exposure cycle.

7. A shutter mechanism for a photographic camera comprising;
means defining an exposure aperture;
a shutter blade movable between a light blocking position and a light unblocking position with respect to said exposure aperture;
a projection on said shutter blade;
a pivotally mounted lever movable through an exposure cycle;
a pair of cantilevered leaf spring arms extending from said lever and embracing said projection on said shutter blade; and
drive means for oscillating said lever rapidly in one direction during a first half of said exposure cycle, causing one of said spring arms to store energy and then rapidly to impart the stored energy to said shutter blade to drive said shutter blade at augmented velocity to rapidly unblock said exposure aperture, said drive means pivoting said lever rapidly in the opposed direction during a second half of said exposure cycle, causing the second of said spring arms to store energy and then rapidly to impart said stored energy to said shutter blade to drive said shutter blade at augmented velocity to rapidly block said exposure aperture, said leaf spring arms absorbing shock from said drive means at the initiation and termination of each half of said exposure cycle.

8. A shutter mechanism for a photographic camera comprising:
a support plate defining an exposure aperture;
a pivotally mounted shutter blade on said support plate movable between a light blocking position and a light unblocking position with respect to said exposure aperture;
a projection on said shutter blade;
a lever pivotally mounted on said support plate and movable through an exposure cycle;
a pair of cantilevered converging leaf spring arms extending from said lever and embracing said projection on said shutter blade; and
drive means for oscillating said lever through an exposure cycle, said drive means including:
a solenoid,
an armature for said solenoid comprising a movable core operatively connected at one end to said lever, said solenoid being energized and said lever being pivoted rapidly in one direction during a first half of said exposure cycle, causing a first one of said spring arms to store energy and then rapidly to impart the stored energy to said shutter blade to drive said shutter blade at augmented velocity to rapidly unblock said exposure aperture,
switching means controlling the energization of said solenoid, and
a return spring connected to said lever, said switching means being actuated and said solenoid being de-energized to permit said return spring to pivot said lever rapidly in the opposed direction during a second half of said exposure cycle, causing the second of said spring arms to store energy and then rapidly to impart the stored energy to said shutter blade to drive said shutter blade at augmented velocity to rapidly block said exposure aperture, said leaf spring arms absorbing shock from said drive means at the initiation and termination of each half of said exposure cycle.

References Cited

UNITED STATES PATENTS

| | | | |
|---|---|---|---|
| 2,153,153 | 4/1939 | Nelson | 95—59 |
| 2,849,937 | 9/1958 | Burger | 95—63 |
| 3,093,047 | 6/1963 | Neff | 95—59 |

JOHN M. HORAN, *Primary Examiner.*